INVENTOR.
AUGUSTUS W. GRISWOLD

March 8, 1966 — A. W. GRISWOLD — 3,239,213

DOCUMENT FEEDER

Filed Jan. 2, 1964 — 3 Sheets-Sheet 2

INVENTOR.
AUGUSTUS W. GRISWOLD
BY
ATTORNEY

INVENTOR.
AUGUSTUS W. GRISWOLD ns Patent Office 3,239,213
Patented Mar. 8, 1966

3,239,213
DOCUMENT FEEDER
Augustus W. Griswold, Rochester, N.Y., assignor to Xerox Corporation, Rochester, N.Y., a corporation of New York
Filed Jan. 2, 1964, Ser. No. 335,293
4 Claims. (Cl. 271—35)

This invention relates to a document feeder and particularly to apparatus for seriatim sheet feeding of documents from the bottom of a stack.

The development of a high speed facsimile transmission has brought about the need for a reliable and simple document feeder. It is necessary that documents of various sizes, weights, thicknesses, and surface conditions be fed to the facsimile transmitting unit individually at a constant rate without misfeed and without delayed time in adjusting the feeding apparatus. The high expense of communication facilities demands efficient usage of transmitting time. Therefore it is also desirable that there be no wasted time in loading the document feeder or adding additional documents to the document feeder. Prior art devices invariably require a time delay in the sheet feeding when new sheets are being added to the stack of sheets already being fed.

It is therefore the primary object of this invention to improve document feeding apparatus to allow a succession of documents to be continuously fed seriatim from the bottom of a stack so that additional documents may be placed on top of the stack without disrupting operation of the apparatus.

It is a further object of this invention to improve document feeding apparatus to allow documents of various sizes, shapes, thicknesses and quality of surface texture to be automatically fed from the same document feeder without adjusting the apparatus.

It is also an object of this invention to improve document feeding apparatuses so that if two or more documents are fed at the same time all but the one on the bottom of the stack will be returned into the stack and be refed in their proper order without interfering with the movement of the bottom sheet.

These and other objects of the invention are attained by means of a feed belt in contact with a portion of the bottom surface of a stack of documents and a separator or retarding roller rotating with a peripheral movement opposite to the movement of the feed belt so that all but the bottom document are retained in the stack during the time that the bottom document is being fed. The feed belt is constructed of a material such that the friction between the belt and the documents is greater than the friction between the two documents and the separator roller has a surface constructed of a material such that the friction on the documents is greater than the friction between two documents, but less than the friction between the feed belt and a document. The feed belts extend a distance beneath the document stack to insure proper gripping of the document and so that short documents will be fed in their proper order.

The feed belt is in extended contact with the surface of the separator roller to provide the necessary friction between the belt and the documents and the roller and the documents. The extended contact or wrap also provides a self-adjusting wear compensator. That is, the amount of surface contact between the belt and the roller is more than is necessary to drive the documents and as the belt surface, and especially the roller surface, wears the result will be a smaller surface contact. However, even after wear, the surface contact will still be sufficient to drive the documents without any manual adjustments.

For a better understanding of the invention as well as other objects and further features thereof, reference is had to the following detailed description of the invention to be read in connection with the accompanying drawings, wherein.

Figure 1:
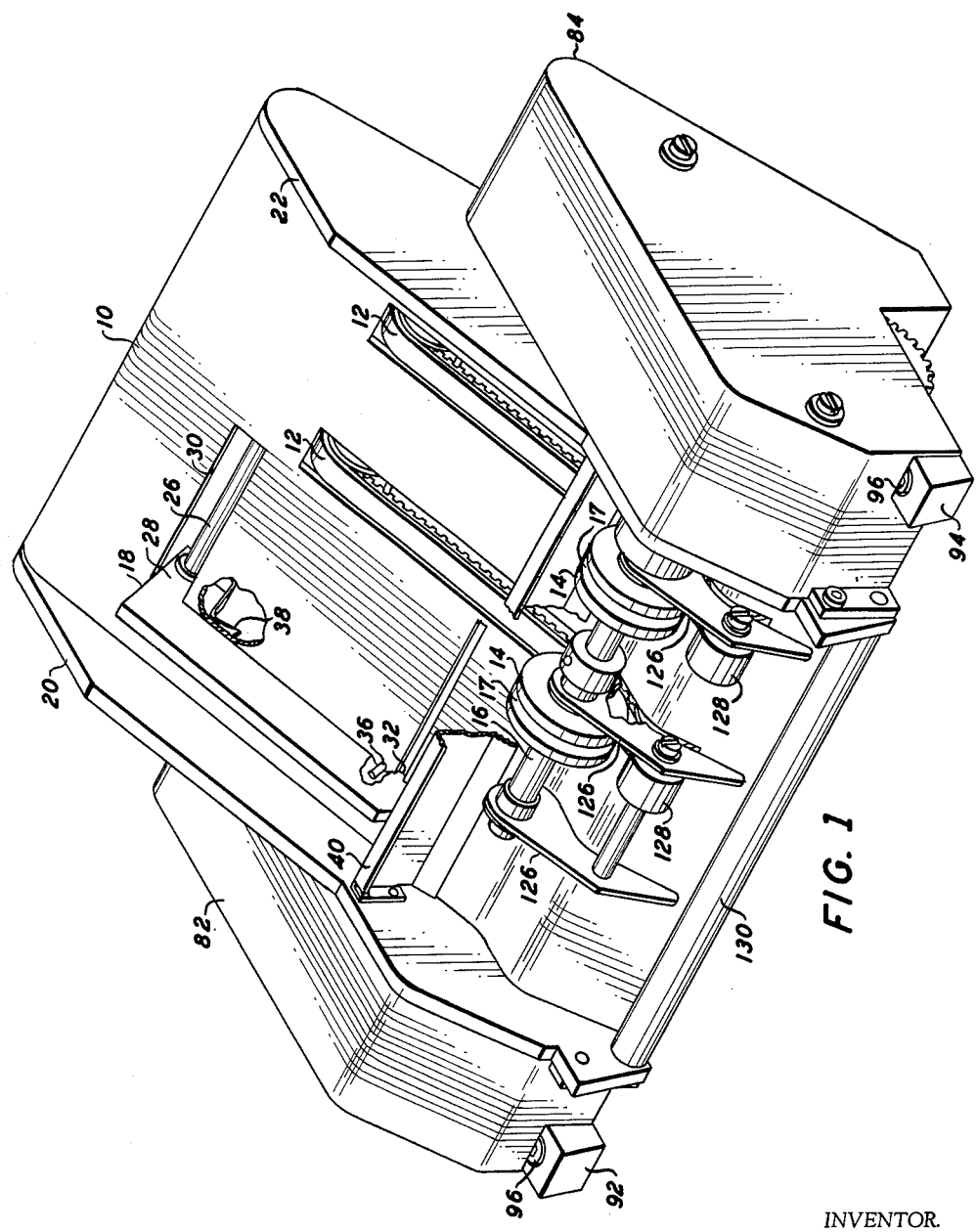
FIG. 1 is a front right side perspective view of the document feeder.
Figure 2:
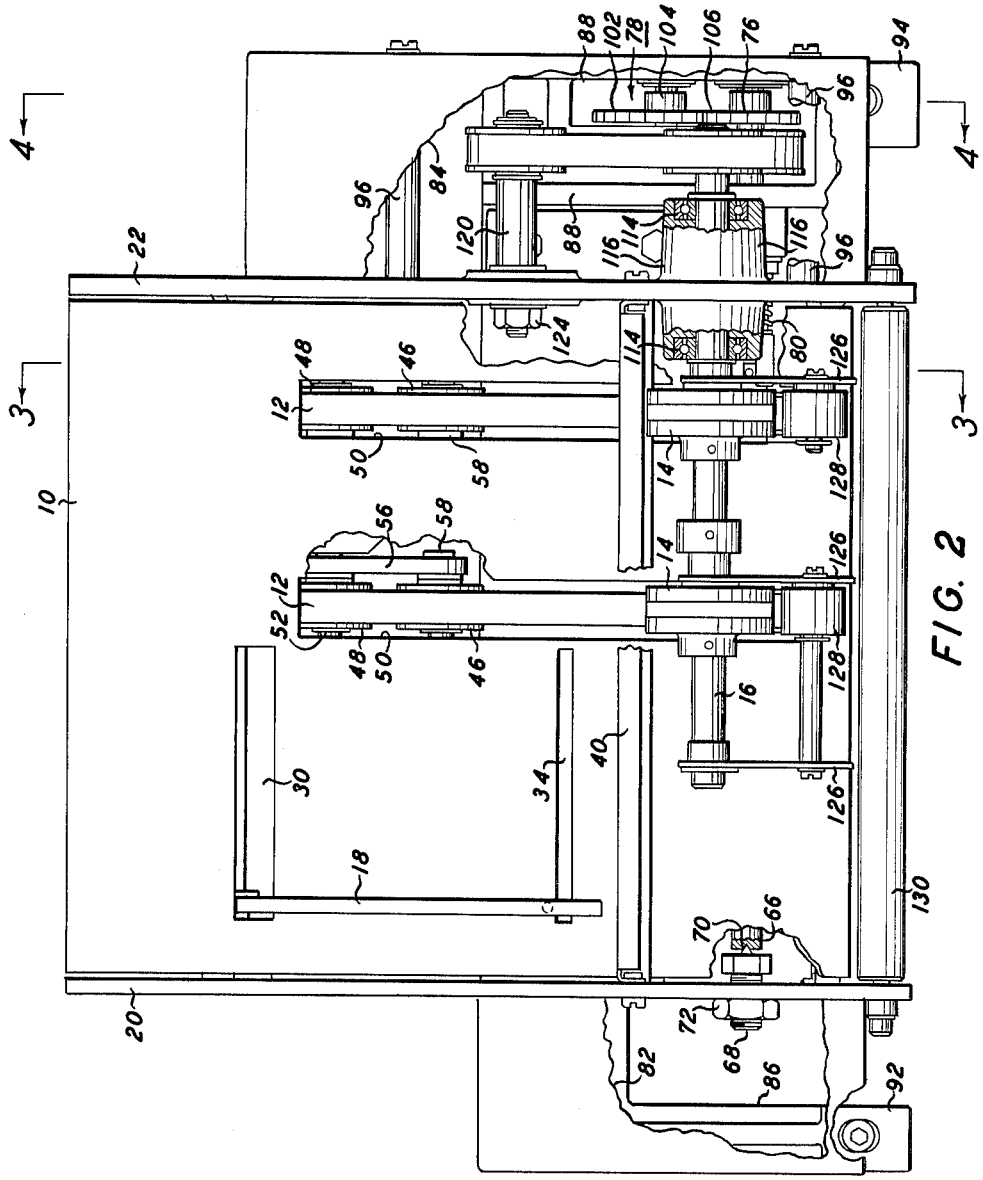
FIG. 2 is a top view of the document feeder shown in FIG. 1.

The document feeding apparatus shown in the drawings consists of a substantially flat document support plate 10 adapted to hold a stack of documents at an angle to the horizontal so that they will tend to be gravity fed toward retard roller 14. The support plate, in the preferred embodiment, is shown inclined at an angle to the horizontal, however, the plate 10 may be in a horizontal orientation or, in extreme cases, with the type of belt feed shown herein the plate could even be sloped away from the retard roller to satisfy a particular application. A pair of document feed belts 12 extend through the surface of the plate 10 into contact with the bottom of the document stack and run parallel to the direction of movement of the documents. A pair of separator rollers 14 are mounted on a shaft 16 in line with the document feed belts and are adapted to rotate with a peripheral movement opposite in direction to the direction of movement of the documents and the document feed belts.

The surface of the feed belts 12 is constructed of sponge or foam rubber, or a similar material such that the friction between the belt and the documents is greater than the friction between two documents. Thus as the belts move, the friction between the belts and the document will carry the document forward. There is a strip 17 of rubber or similar material about the periphery of the separator rollers so that the friction with the documents is greater than the friction between the documents but is less than the friction between the belts and the paper.

As a document is carried forward by the belts, the separator rollers force the document against the feed belts and also tend to resist the forward movement of the document and to move it back towards the document stack. Because of the greater friction between the belt and the document, the document passes beneath the separator rolls. As two or more documents are carried forward by the belt the movement of the top sheet is impeded by the separator rollers and is held back until the bottom sheet has passed beneath the separator roller.

After the bottom sheet is advanced a distance sufficient for the surface of the belt to contact the next lowest sheet, that sheet is moved forward by the belt until it engages the separator roll at which point the separator roll restrains the sheet in that position until the bottom sheet has left the stack. The next sheet then immediately follows the previous sheet and passes beneath the separator rolls.

The document stack is positioned on the document support plate by means of a registration guide 18 so that the documents are properly registered for feeding to the main machine. The document support plate 10 is mounted between a pair of side frames 20 and 22 by means of brackets 24 secured to the underneath side of the support plate and to the side frames 20 and 22. The registration guide 18 is slideably mounted on a shaft 26 extending between the side frames 20 and 22 beneath the document support plate 10. An arm 28 on the registration guide extends through a slot 30, in the document support plate. The shaft 26 is journaled in the arm 28 so that the registration guide may be positioned across a portion of the width of the document support plate to provide side registration. A small projection 32 on the opposite end of the registration guide 18 extends through a second slot 34 which is parallel to the first slot 30 to guide the movement of the registration guide. The registration guide 18 rides across the surface of the support plate 10 on a small nylon pin 36 and is held in position by a leaf spring 38 mounted on the registration guide and pressing on the underside of the support plate.

A portion of the document stack is prevented from sliding forward towards the separator rollers 14 by means of a document retaining plate 40 which extends between the side plates 20 and 22 immediately ahead of the separator rollers. A small clearance or opening 42 is provided between the bottom of the retaining plate 40 and surface of the support plate 10 so that the bottom documents of he stack may slide beneath the retaining plate while the main body of the stack is being held in position.

The feed belts 12, in the form of timing belts with a sponge rubber outer layer, pass around a series of pulleys 44, 46 and 48 and extend through a pair of parallel slots 50 in the surface of the document support plate 10. The pulleys 48 are mounted on a shaft 52 which is supported by a bearing block 54 secured to the underneath side of the support plate 10. The pulleys 48 guide the belt 12 upward through the slots 50 into contact with the document stack. A pair of levers 56 are supported on the shaft 52. One arm of the levers rotatably supports stub shafts 58. The pulleys 46 are mounted on the stub shafts 58 and serve as tension pulleys for the belt 12. The other arm of the levers 56 is connected to a tensioning spring 60 so that the tensioning spring tends to rotate the lever about shaft 52 exerting tension on the belt 12. The tensioning spring 60 are also secured to adjustable tensioning lugs 62 mounted in brackets 64 on the underneath side of the support plate 10.

The pulleys 44 are the drive pulleys for the belts 12, and are mounted on a shaft 66. The relative position of the pulleys 44 and the separator rollers 14 is such that the belts 12 are in extended surface contact with the periphery of the separator rollers 14. That is, the belts are deflected by the periphery of rollers 14 from a straight line path between the pulleys 48 and 44 thus providing extensive surface contact between the separator rollers 14 and the documents on the belts 12. The shaft 66 is removably mounted between the side plates 20 by means of bolt 68 having a cone point 70. The end of the shaft 66 is adapted to mate with the cone point 70 to provide a bearing surface. The bolt 68 is secured in a threaded hole in side frame 20 and held in place by lock nut 72. The opposite end of the shaft 66 has a pair of projections 74 which mate with slots in a coupling 75. The coupling 75 also mates with projections on a shaft 76 extending through the side frame 22 from the drive system 78. A compression spring 80 around the shaft 76 bears against the coupling 75 and a retainer for a ball bearing, not shown, which supports the shaft 76, forcing the shaft 66 against the cone point 70. To remove or replace the belts 12 the coupling 75 may be forced against the compression spring 80 and the shaft 66 removed from the cone point 70. The shaft 52 supporting the pulleys 48 may be removed by disassembling the bearing block 54.

Adjacent to the side frames 20 and 22 are a pair of cover plates 82 and 84 which enclose support frames 86 and 88 shown herein as formed integrally with side frames 20 and 22 respectively. The entire document feed apparatus is supported from a counter 90 on the main machine directly in front of the feed rollers 11 by means of a pair of mounting blocks 92 and 94 formed as part of the support frames 86 and 88 respectively. The mounting blocks are secured to the counter by means of bolts 95 and are shaped to support the apparatus on the counter 90 with the document support plate 10 at an angle to the horizontal, as previously described.

The cover plate 84 is spaced from the side frame 22 by means of a pair of spacer bars 96 and houses the drive system 78. In order that the movement of the belts 12 may be synchronized with the feed rolls 11 of the main machine the drive for the document feeder is taken directly from a pinion 98 in the main machine. In order to prevent buckling of documents being fed and to eliminate the necessity for precise synchronization of the document feeder in the main machine it may be desirable to have the feed rolls 11 operate at a slightly higher surface speed than the belts 12 so that when a document is engaged by the feed rolls 11 it will be driven by the feed rolls 11 rather than the belts 12 and will be moving at a slightly higher speed than the next succeeding document from the document feeder.

A main drive gear 102 is mounted on a shaft 104 journaled in the frame 88 and meshes with the pinion 98 and a gear 106 on the shaft 76. The drive from the main machine is transferred through the pinion 98 to the gear 102 to the gear 106 which in turn rotates the shafts 76 and 66. The pinion 98 may be replaced by separate driving means such as an electric motor when the document feeder is to be operated independently of the main machine. Also mounted on the shaft 76 is a belt drive pulley 108 which transmits power through timing belt 110 to a pulley 112 on shaft 16. The shaft 16 is centrally supported by means of bearing 114 in bosses 116 formed integrally with side frame 22 so that the shaft 16 extends in cantilever fashion on either side of side frame 22 to support the pulley 112 and the separator rollers 14. The tension on drive belt 110 is adjustable by means of a pulley 118 mounted on shaft 120. The shaft 120 is secured in a slot 122 in the side frame 22 and is positionable throughout the length of the slot by means of lock nut 124. By use of the drive belt 110 the shaft 16 is driven in the same direction as the shaft 76 thus causing the peripheral movement of the belts 12 and the separator rollers 14 to be in different directions.

Figure 3:
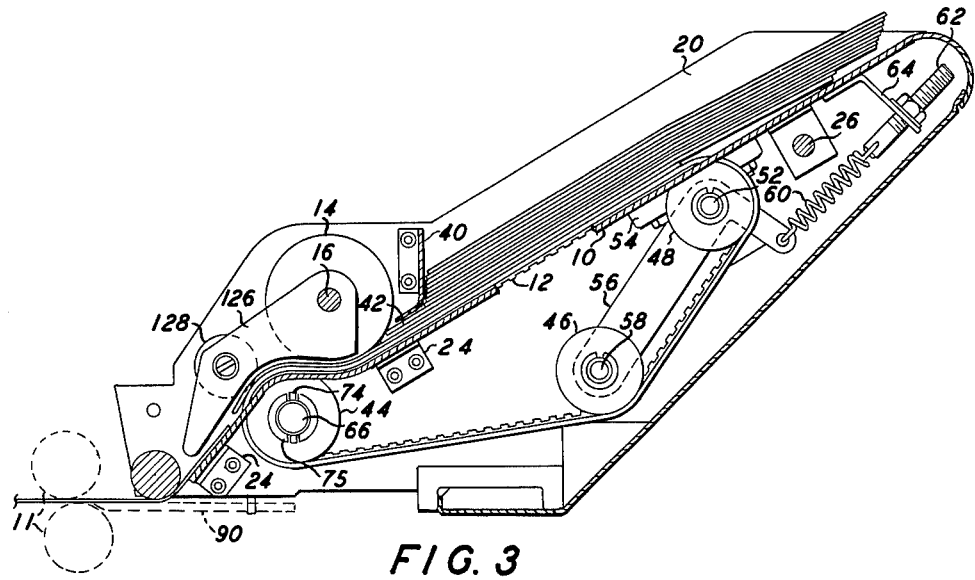
FIG. 3 is a side sectional view of the document feeder taken along lines 3—3 of FIG. 2.
Figure 4:
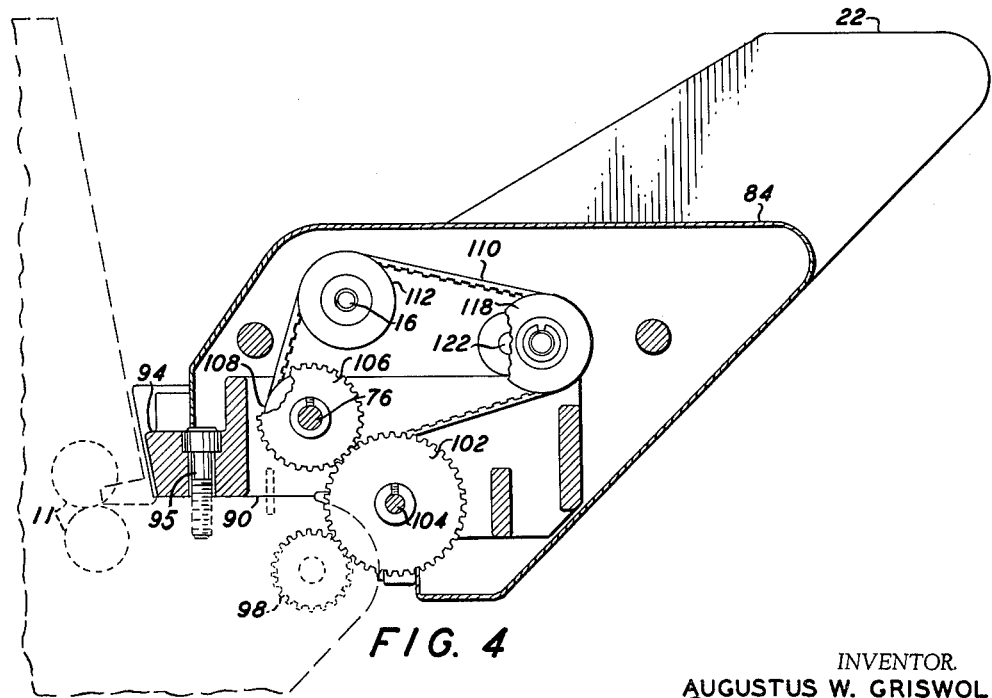
FIG. 4 is a right side sectional view of the document feeder taken along lines 4—4 of FIG. 2.

A series of document deflectors 126 are suspended from the separator roller shaft 16 and contain idler rollers 128 which ride on the document feed belts 12. The deflectors 126 and the idler rollers 128 guide a document downward towards the counter 90 as it passes by the separator rollers 14. As the document contacts the counter 90 it is guided beneath a roller 130 into the machine feed rollers 11 as seen in FIG. 3. The roller 130 is rotatably suspended between the side frames 20 and 22.

In operation a stack of documents are placed on the plate 10 and feed forward by the movement of belts 12. The resiliency of the belts 12 compensated for both wear of the belt and for variations in thicknesses of documents. During operation additional documents may be placed on top of the stack without interrupting operation of the apparatus or disrupting the flow of documents.

While the invention has been described with reference to the structure disclosed herein, it is not confined to the details set forth, and this application is intended to cover such modifications or changes as may come within the purposes of the improvements or the scope of the following claims.

What is claimed is:

1. A document feeding apparatus of the type wherein documents are fed seriatim from the bottom of a stack including:
  means to support a stack of documents;
  a document feed belt positioned with a portion extending slightly above the surface of the support means and parallel thereto and extending outwards beyond the edge of the document stack;
  means to drive the feed belt in a direction substantially parallel to the bottom of the stack to feed documents from the stack;
  separator rollers positioned adjacent to the document stack in extended surface contact with the portion of the feed belts extending beyond the document stack;

means to rotate the separator rollers so that the surface of the rollers moves in a direction opposite to the direction of movement of the feed belts.

2. A document feeding apparatus of the type wherein documents are fed seriatim from the bottom of the stack including:
- a support plate for supporting the document stack;
- a document feed belt positioned with a portion extending slightly above the surface of the support plate and parallel thereto;
- separator rollers positioned above the surface of the support plate in extended surface contact with the feed belt;
- driving means operatively connected to the feed belts and the separator rollers to drive the feed belts in the direction that the documents are to be fed and to drive the separator rollers in a direction wherein the surface of the separator rollers is opposed to the direction of movement of the feed belts; and,
- means to retain the upper portion of the document stack during movement of the feed belt.

3. A document feeding apparatus of the type wherein documents are fed seriatim from the bottom of the stack including:
- a pair of frame members;
- a support plate mounted between the frame members for supporting a document stack;
- a continuous feed belt mounted on a series of pulleys supported between frame members with a portion of the feed belt extending parallel to the support plate slightly above the surface of the support plate to be in contact with the bottom of a document stack on the support plate and a portion of the feed belt extending beyond the leading edge of the document stack;
- means to drive the feed belts to remove sheets seriatim from the bottom of the document stack;
- means mounted between the frames, adjacent to the leading edge of the document stack, to retain the upper portion of the document stack upon movement of the conveyor belt;
- separator rollers supported by the frame members in a position relative to the feed belts so that the feed belts are deflected into extended surface contact with the periphery of the separator rollers; and
- means to rotate the separator rollers in a direction such that the movement of the periphery of the rollers is in the opposite direction to the movement of the feed belts.

4. A sheet feeding and separating apparatus of the type wherein sheets are continuously fed from the bottom of a stack including:
- a sheet stack support plate inclined in the direction of sheet feeding;
- means to retain all but the lowermost portion of the sheet stack on the inclined support plate;
- a continuous sheet feed belt, mounted for rotation about a series of pulleys, with a portion of its surface extending parallel to the support plate at a position slightly above the surface of the support plate to thereby be in contact with the bottom sheet of a sheet stack on the support plate and also extending beyond the sheet stack in the direction of sheet feeding;
- a separator roller mounted in extended surface contact with the portion of the sheet feed belt that extends beyond the sheet stack;
- means to rotate the feed belt about the pulleys in the direction of sheet feeding to thereby carry sheets from the bottom of the stack past the separator roller; and
- means to rotate the separator roller so that its surface movement is opposed to movement of the feed belt to thereby force sheets other than the bottom sheet carried forward by the feed belt back toward the sheet stack until the bottom sheet has passed the separator roller.

References Cited by the Examiner

UNITED STATES PATENTS

| | | | |
|---|---|---|---|
| 1,646,117 | 10/1927 | Smith | 271—41 |
| 1,866,847 | 7/1932 | Finfrock | 271—35 |
| 1,955,066 | 4/1934 | Hiller | 271—35 |
| 1,976,788 | 10/1934 | Kurth | 271—35 |

M. HENSON WOOD, JR., *Primary Examiner.*

ROBERT B. REEVES, *Examiner.*